United States Patent

Boyd et al.

[15] 3,675,039
[45] July 4, 1972

[54] COHERENT OPTICAL DEVICES EMPLOYING ZINC GERMANIUM PHOSPHIDE

[72] Inventors: Gary Delane Boyd, Rumson; Ernest Buehler, Chatham; William Bentley Gandrud, Madison, all of N.J.

[73] Assignee: Bell Telephone Laboratories, Incorporated, Murray Hill, N.J.

[22] Filed: Feb. 9, 1971

[21] Appl. No.: 113,913

[52] U.S. Cl. ............... 307/88.3, 250/199, 250/83.3 HP, 331/107 R
[51] Int. Cl. ............................. H03f 7/00, H04b 9/00
[58] Field of Search ................ 307/88.3; 331/107; 250/199

*Primary Examiner*—Roy Lake
*Assistant Examiner*—Darwin R. Hostetter
*Attorney*—R. J. Guenther and Arthur J. Torsiglieri

[57] ABSTRACT

An upconverting receiver for modulated radiation at a carrier wavelength of 10.6 micrometers and a tunable parametric oscillator operating in the infrared portion of the spectrum are disclosed, in each of which a zinc germanium phosphide (ZnGeP₂) crystal is employed as the interaction medium and is pumped by a laser operating substantially at 1.06 micrometers in the infrared in a direction substantially normal to the optic axis. This crystal is presently unique in providing phase matching nearly normal to the optic axis for sum frequency upconversion from a signal wavelength of 10.6 micrometers.

11 Claims, 8 Drawing Figures

INVENTORS G. D. BOYD
E. BUEHLER
W. B. GANDRUD

BY Wilford L. Wiener
ATTORNEY

PHASE MATCHED SUM MIXING
AT $\theta_m$ IN ZnGeP$_2$

COHERENT OPTICAL DEVICES EMPLOYING ZINC GERMANIUM PHOSPHIDE

BACKGROUND OF THE INVENTION

This invention relates to coherent optical devices of the type used for frequency shifting of an optical frequency by mixing of two different optical frequencies and of the type used for producing tunable oscillations by optical parametric generation.

More particularly, we are mainly concerned herein with devices operating in the infrared portion of the optical spectrum, with great interest in the region of the infrared from about 0.7 micrometer, the limit of the visible spectrum, out to about 12 micrometers, although such devices might operate at visible wavelengths as short as 0.64 micrometers. The interest in the infrared region stems from the existence of two tested and proven powerful sources of coherent radiation in this region. Namely, these are the high power carbon dioxide ($CO_2$) laser operating upon vibrational-rotational transitions at about 10 micrometers and the solid state laser employing neodymium ions in a dielectric crystal or glassy host and operating at about 1.06 micrometers.

Unfortunately, these lasers are not tunable over broad ranges; and in the case of the more efficient carbon dioxide laser, there are no suitably sensitive and fast detectors available for room temperature operation at wavelengths near 10 micrometers. Therefore, as made clear in the article by D. A. Kleinman and G. D. Boyd in the Journal of Applied Physics, Volume 40, (1969) at page 546, it has been a long-standing objective in the laser and coherent optical device arts to provide upconversion, that is, frequency shifting of the 10.6 micrometer radiation to wavelengths shorter than 1 micrometer, at which efficient photomultiplier detection or avalanche photodiode detection can be obtained.

Also, it has been a long-standing objective in these arts to obtain practical parametric oscillation in the infrared beyond the range, and preferably complementary to the range, of tuning of the lithium niobate parametric oscillator. The lithium niobate parametric oscillator operating in the visible region of the spectrum has been proven to be practical in spite of the optical damage problem which exists in some portions of its possible tuning range. One of our objectives has been to extend this practical range of parametric oscillation into the above-described portion of the infrared region.

SUMMARY OF THE INVENTION

According to our invention, the foregoing objectives are obtained in each of the respective types of coherent optical devices by pumping a zinc germanium phosphide ($ZnGeP_2$) crystal with coherent radiation at or near the near-infrared limit of the visible spectrum and nearly normal to the optic axis of the crystal. Operation for a phase-matched angle $80° \leq \theta_m \leq 90°$ is nearly normal to the optic axis and is adequate to minimize the effects of double refraction.

In particular, the upconversion of modulated 10.6 micrometer radiation to wavelengths shorter than 1 micrometer by sum-frequency mixing in a phase-matched collinear interaction in zinc germanium phosphide is virtually the only practical proposal for such upconversion at the present time. Such an upconverter is also potentially useful for image upconversion.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figures 1, 1A:
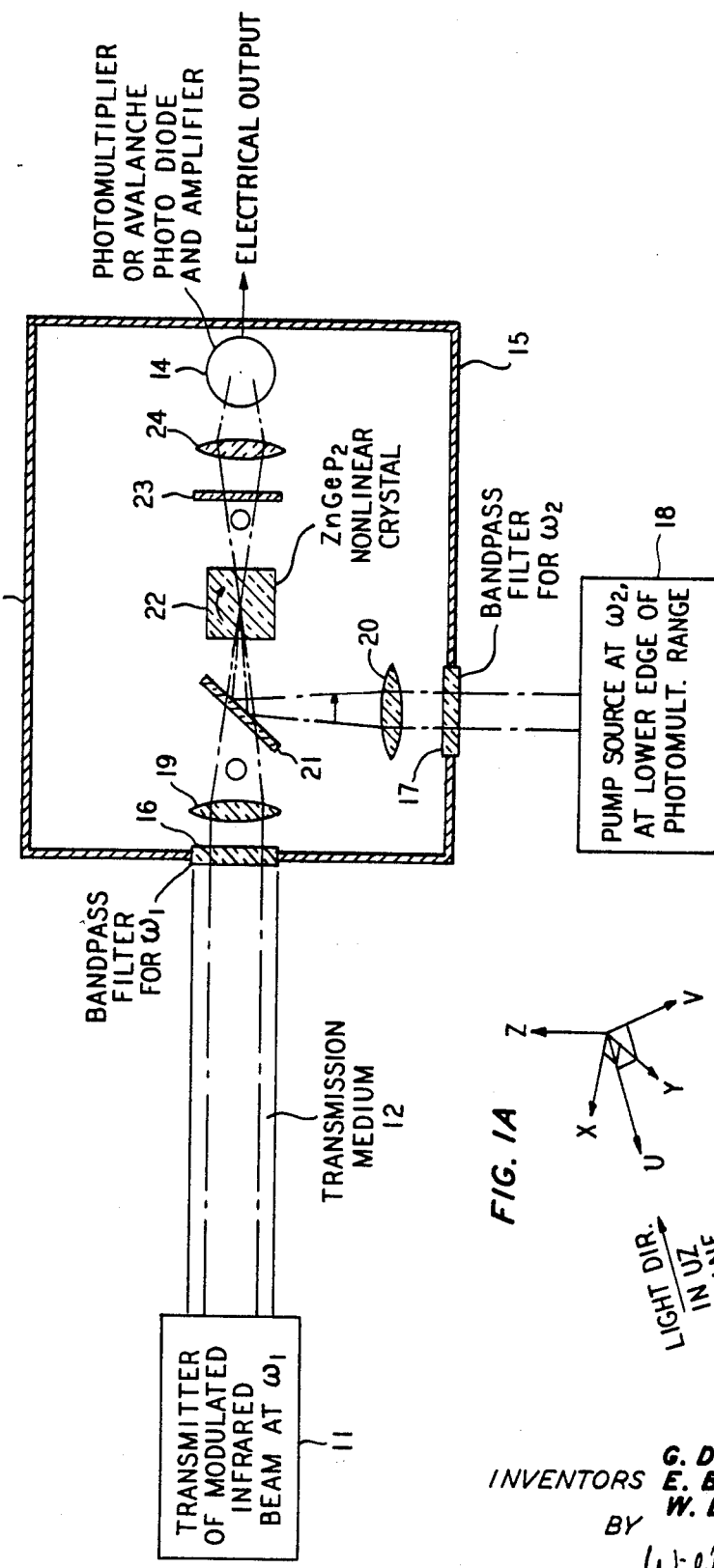
FIG. 1 is a partially pictorial and partially block diagrammatic illustration of the upconverting embodiment of the invention.
FIG. 1A shows a coordinate system useful in designating crystal orientation in FIG. 1 with respect to light beam direction.

In FIG. 1, modulated infrared radiation, illustratively at a carrier wavelength of about 10.6 micrometers, is supplied from a transmitter 11 and is transmitted through a transmission medium 12, illustratively a closed pipe, to an upconverting receiver 13. The receiver 13 shifts the carrier frequency upwards in the spectrum, i.e., upconverts it to a frequency $\nu_3 = \nu_2 + \nu_1$, where $\nu = 1/\lambda = f/c$ and thus is frequency in units of the reciprocal of the wavelength, for example reciprocal micrometers ($\mu^{-1}$). This frequency is chosen to be about $1.034\mu^{-1}$, or more, corresponding to a wavelength of about $\lambda_3 = 1/\nu_3 = 0.967$ micrometer, which is suitable for sensitive detection by either an S-1 photomultiplier of well-known type or an avalanche photodiode, also of well-known type. A photomultiplier or photodiode 14 and associated amplifier are indicated schematically as providing the electrical output from receiver 13. The modulation originally impressed upon the infrared beam is thereby obtained for easy utilization at the output.

The receiver 13 further includes the light-tight enclosure 15 in which windows 16 and 17 are narrow band filters disposed to admit only the modulated beam from transmitter 11 and a pumping beam from a pumping source 18. The receiver 13 also includes lenses 19 and 20 for focusing the respective beams upon the dichroic reflector 21, which combines the beams for collinear propagation into zinc germanium phosphide crystal 22 in a direction nearly normal to the optic axis thereof. Beyond crystal 22 in the path of the collinear propagation of the supplied beams and of any collinearly propagating generated beams are disposed a bandpass filter 23 for the generated beam, which serves to block residual components of the supplied beams, and a lens 24 for focusing the generated radiation upon photomultiplier or photodiode 14. Filter 23 and lens 24 may readily be interchanged in relative order.

Significant features of an upconverting receiver according to our invention are the use of a known powerful source near one micrometer wavelength as pump source 18 and the use of a zinc germanium phosphide crystal 22 which, although mounted for angular rotation about an axis orthogonal to the plane formed by the propagation direction and the optic axis, is oriented substantially to have its optic axis nearly orthogonal to the common path of propagation and nearly parallel to the polarization of the pumping beam. With this optic axis nearly normal to the path of the supplied beams, no significant double refraction is suffered in generating the sum-frequency wave, which is the desired upconverted optical radiation.

The pump source 18 is preferably the neodymium ion laser employing a dielectric host, such as yttrium aluminum garnet (YAG), or a glassy host, and operating at about $\lambda_2 = 1.064$ micrometers, though other strong lasers at shorter wavelengths could also be used. In this case, the wavelength of the upconverted radiation, the generated sumfrequency radiation, is $\lambda_3 = 0.967$ micrometers, which is well within the range of high sensitivity of a photomultiplier using an S-1 photocathode or, alternatively, an avalanche photodiode, such as the EG&G, Inc. type AV-102 silicon photodiode. Other photodiodes can be used. In addition, instead of the S-1 photocathode, one might use one of the new, efficient photocathodes of the type described in the article "III-V Photocathodes," *Proceedings IEEE*, 58, 1788 (Nov., 1970).

The operation of the embodiment of FIG. 1 is best described with reference to Table I below and the curves of FIGS. 3 through 6. Table I sets forth our detailed measurements of the ordinary and extraordinary indices of refraction of crystal 22 throughout its optical transmission region. These measurements indicate that phase matching is achievable for combinations of frequencies $\nu_3 = \nu_2 + \nu_1$, as shown in FIG. 4, where $\lambda_3 = 1/\nu_3$, $\lambda_2 = 1/\nu_2$ and $\lambda_1 = 1/\nu_1$.

Figure 3:
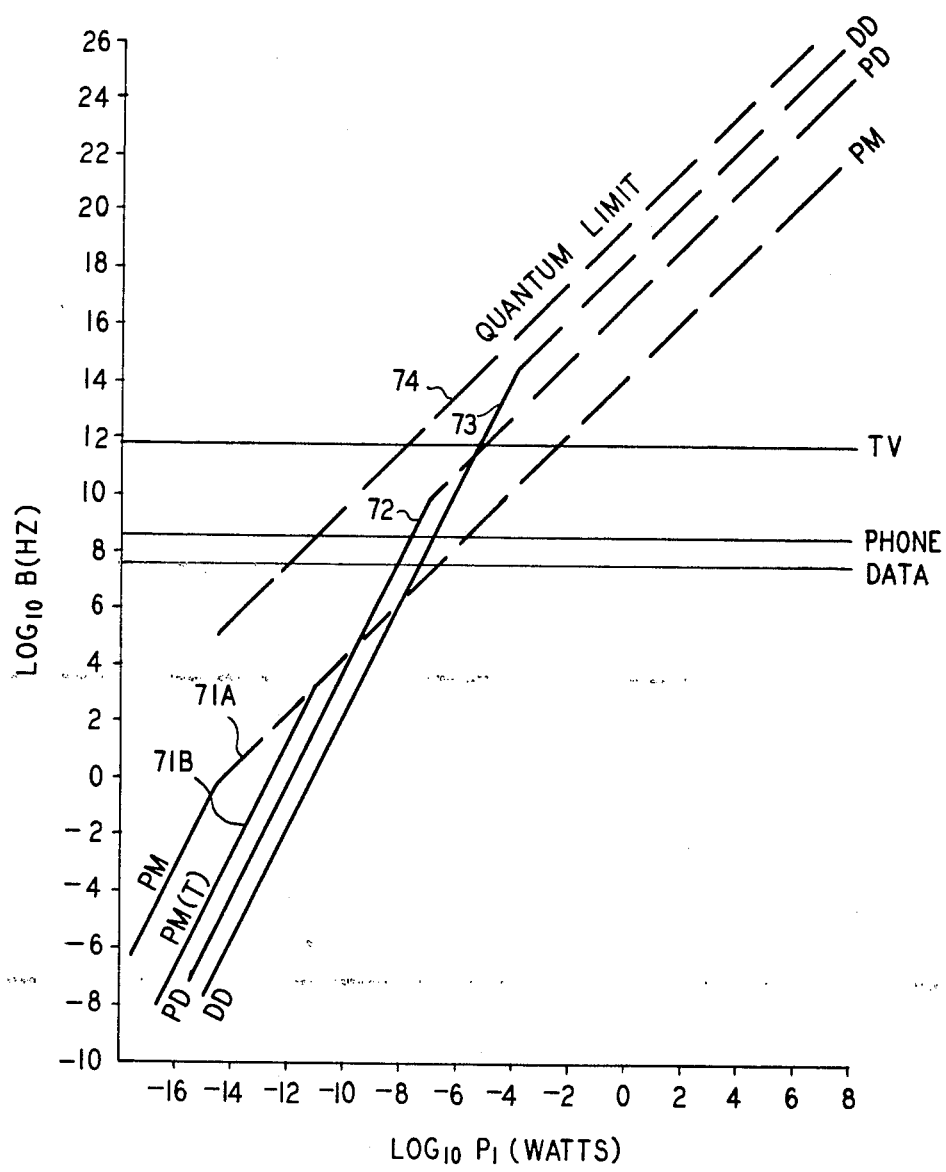
FIG. 3 shows curves which compare the performances of the two detection techniques usable in the upconverter embodiment with prior art direct detection of the 10.6 micrometer radiation.
Figure 4:
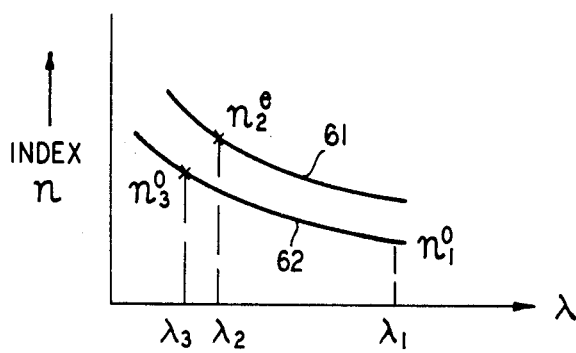
FIG. 4 shows curves which indicate index of refraction versus frequency relationships in a general form for ordinary and extraordinary polarizations of radiation in the embodiments of FIGS. 1 and 2.

The curves of FIG. 3 compare the operation of the embodiment of FIG. 1 with prior direct detection of 10.6 micrometer radiation under the following set of conditions. Crystal 22 provides a 1 centimeter optical pathlength, beam source 18 supplies 1 watt of effective pump power to crystal 22, and lenses 19 and 20 provide optimum focusing of the supplied beams, as described by G. D. Boyd and D. A. Kleinman in U.S. Pat. No. 3,530,301, issued Sept. 22, 1970. In addition, negligible absorption in crystal 22 is assumed, although the description of performance can be corrected for the actual losses occurring in such a crystal. Further, we prefer single-pass operation, so that there are no resonator alignment problems immediately associated with the crystal 22. This is a substantial advantage in the embodiment of FIG. 1 insofar as tuning is illustratively achieved, at least partially, by angular rotation. The front and back surfaces of crystal 22, through which the beams pass, are preferably anti-reflection coated to provide such single-pass operation.

The overall operation of the embodiment of FIG. 1 as a phase-matched upconverter with avalanche photodiode detection or photomultiplier detection is well illustrated by the general comparison shown in FIG. 3.

In FIG. 3, the ordinate value is $\log_{10} B$ with B in units of Hertz (Hz), where B represents the system noise performance; and the abscissa value is $\log_{10} P_1$ in units of watts, where $P_1$ is the signal power of the supplied modulated radiation. $B = (S/N)\cdot f$, where $S/N$ is the detected signal-to-noise ratio and $\Delta f$ is the electrical signal bandwidth. Curve 71A represents the performance of the embodiment of FIG. 1 with photomultiplier detection without considering thermal background noise. Curve 71B differs from curve 71A by including typical thermal background noise. Curve 72 represents the performance of the embodiment of FIG. 1 with typical avalanche photodiode detection. Curve 73 represents prior art direct detection; and dashed line 74 represents the quantum limit of detection. The curves are solid in the dark current limit and dashed in the shot noise limit.

Implicit in the curves of FIG. 3 are noise equivalent powers (NEP) and quantum efficiencies $\eta$ as conventional in the art. For direct detection we assume a mercury (Hg)- doped germanium (Ge) photoconductor at 4° K with $NEP_1 = 5 \times 10^{-12}$ watts/(Hertz)$^{1/2}$, $\eta_1 = 0.5$. For optical mixing plus photomultiplier with an S-1 photocathode response $NEP_3 = 4 \times 10^{-16}$ watts/(Hertz)$^{1/2}$, $\eta_3 = 0.0015$. For optical mixing plus avalanche photodiode detector of type EG&G, Inc. AV-102

$NEP_3 = 1 \times 10^{-13}$ watts/(Hertz)$^{1/2}$, $\eta_3 = 0.5$.

Figure 2:
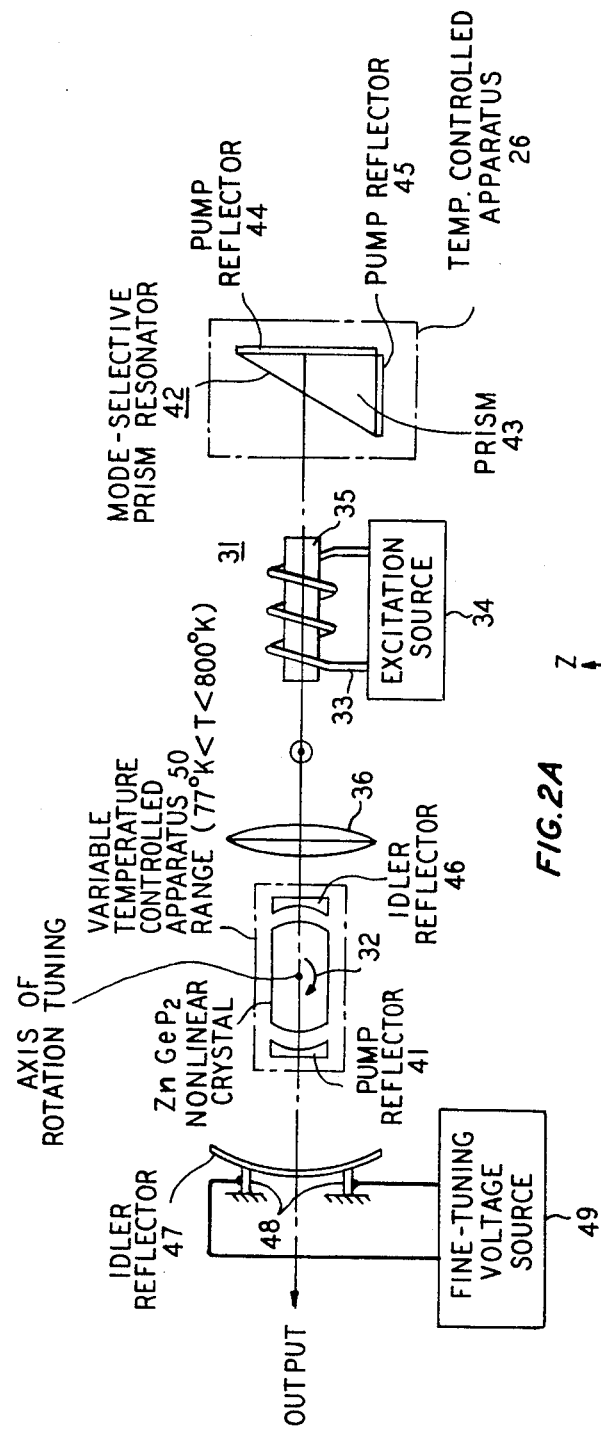
FIG. 2 is a partially pictorial and partially block diagrammatic illustration of a parametric oscillator according to our invention.

This format for showing receiver performance is similar to that in FIGS. 2 and 7 in the above-cited article by D. A. Kleinman and G. D. Boyd in the *Journal of Applied Physics*.

It may be seen from FIG. 3 that our upconverting detector as shown in FIG. 1 with an avalanche photodiode is superior to direct detection with a mercury-doped germanium photoconductor for $B \leq 4 \times 10^{11}$ Hz, since a lower supplied power of modulated radiation is required. With a photomultiplier, it is superior to direct detection for $B \leq 2.5 \times 10^6$ Hz. This range of the product of bandwidth and signal-to-noise ratio for which superior operation is obtained is suitable for a wide range of applications, such as communication system applications in which relatively narrow band telegraph channels, voice channels and even video channels are used, as indicated in FIG. 3 by the labeled horizontal lines indicating the value of B required. The requirements for an application to data channels are described by Kleinman and Boyd above cited. Other applications are feasible for which the detector of FIG. 1 is superior and include all of the applications mentioned at page 551, column 1 of the above-cited article. For image upconversion, which is suggested here as one practical application of FIG. 1, the modulated beam from transmitter 11 is spatially modulated by scattering from an object so that it bears wavefront perturbations corresponding to an optical image. For this purpose, it is assumed the transmission medium is illustratively relatively short. The beam from source 18 is illustratively focused to have a spherical wavefront substantially matching that of the modulated beam throughout the propagation through crystal 22, so that phase-matched interaction occurs across the cross-sectional region of coincidence. It may be noted that, if the medium is sufficiently thin, wavefront matching is not necessary. Also, under appropriate conditions, a planar pump beam will produce useful phase-matched upconversion.

It should be noted that for the typical illustrative frequencies employed in FIG. 1, a small rotation of crystal 22 about its tuning axis deviates the propagation direction from the normal to the optic axis to achieve phase matching.

Figure 5:
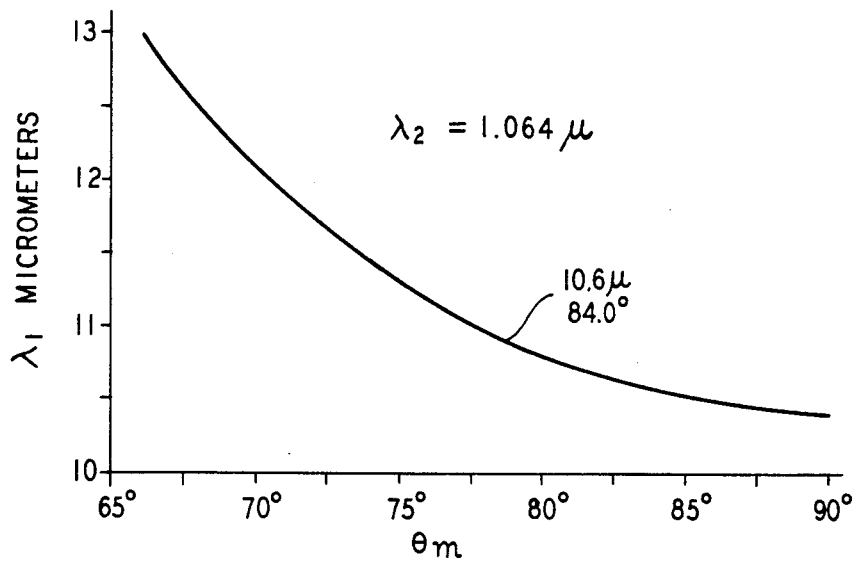
FIG. 5 shows a typical curve applicable to phase-matched upconversion.

For example, if a wavelength $\lambda_2$ of about 1.064 micrometers is assumed for the locally supplied radiation of extraordinary polarization, then the angular tuning curve of FIG. 5 is applicable. In FIG. 5 curve 81 shows $\theta_m$, the phase-matching angle varying from about 65 degrees to 90 degrees for the wavelength $\lambda_1$ of the received radiation varying from about 13 micrometers to 10.4 micrometers, respectively.

It should be clear that many other wavelengths $\lambda_2$ are feasible with and could be supplied from, known lasers. For each such wavelength $\lambda_2$, a new phase-matching curve could be drawn essentially of the same shape as curve 81, but displaced therefrom. Each such curve applies to a phase-matched process of upconversion.

Now let us discuss the phase-matching curves applicable to both upconversion and parametric generation.

Figure 6:
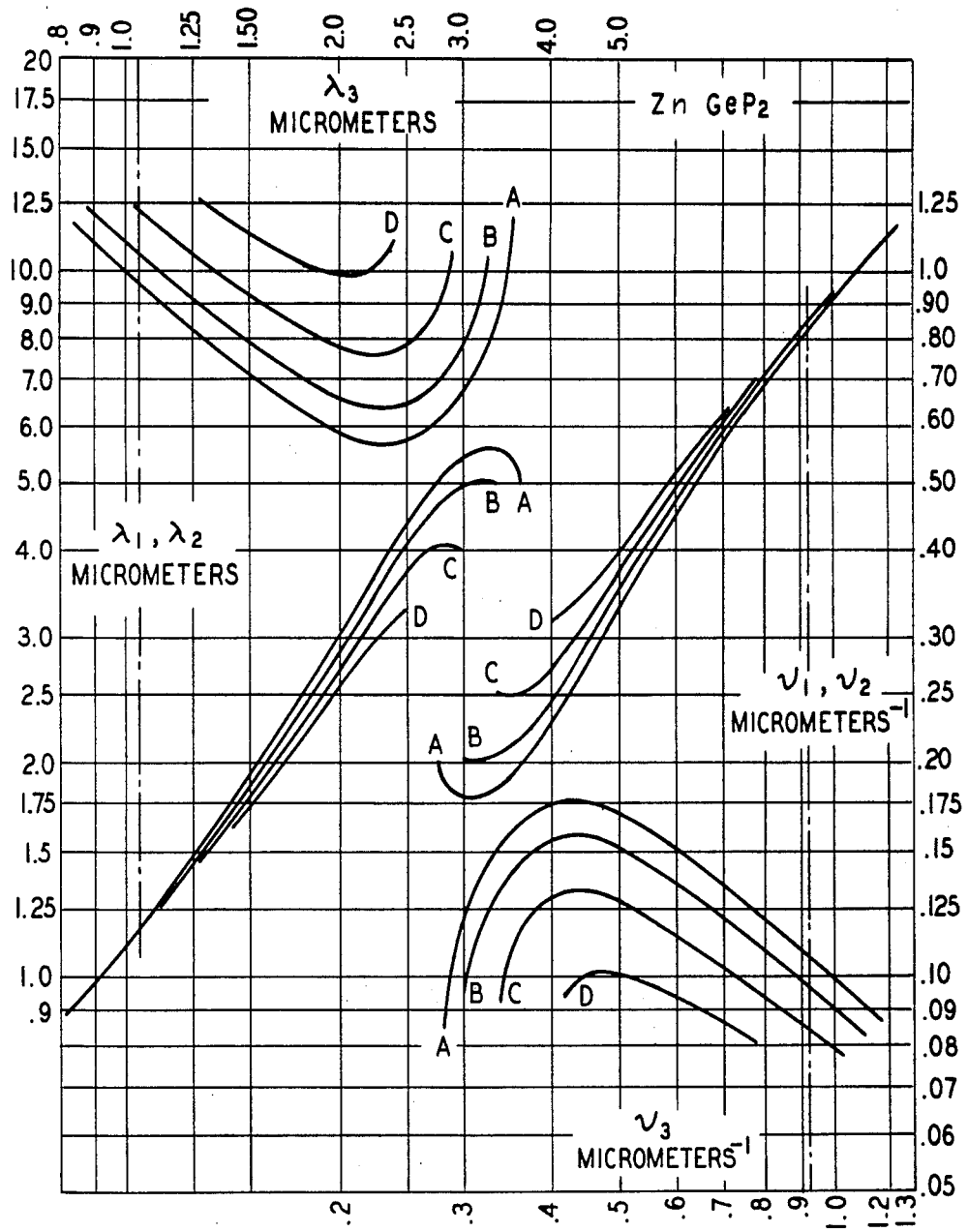
FIG. 6 shows more general tuning curves for phase-matched interactions according to our invention.

Shown in FIG. 6 is the tuning curve of phase-matched frequencies versus the highest frequency $\nu_3$ at propagation directions $\theta_m = 90°$ (curves A), $\theta_m = 74°$ (curves B), $\theta_m = 66°$ (curves C), $\theta_m = 60°$ (curves D), where $\theta_m$ is the angle made by the propagation direction of the supplied beams with respect to the optic axis. As an alternative, the stoichiometry of crystal 22 can be carefully chosen at the time of crystal growth to provide operation substantially normal to the optic axis for a desired set of wavelengths.

The curves of FIG. 6 can be explained more completely as follows. The values along the upper, horizontal axis are wavelengths for the shortest wavelength, $\lambda_3$, (highest $\nu_3$) radiation in the phase-matched interaction. The values along the left-hand, vertical axis are wavelengths $\lambda_1$ and $\lambda_2$ for the other two radiations involved in the interaction. If one of $\lambda_1$ and $\lambda_2$ is assigned to the upper left set of curves A, B, C, D, then the other is assigned to the set of curves immediately therebelow. The above-designated sets of axis values are not used with the two right-hand sets of curves. The latter are used only when it is desired to read frequency values (in terms of reciprocal micrometers). In that event, the highest frequency $\nu_3$ is read at the bottom, horizontal axis and vertical axis values are read as $\nu_1$ and $\nu_2$, from the respective sets of right-hand curves in either order.

For example, a mixing experiment between the $\nu_2 = 0.94\mu^{-1}$ ($\lambda_2 = 1.064\mu$) $Nd^{3+}$: YAG laser and the $\nu_1 = 0.0934\mu^{-1}$ ($\mu_1 = 10.6\mu$) $CO_2$ laser demonstrated successful collinear phase-matched sum mixing at $\nu_3 = 1.0343\mu^{-1}$ ($\lambda_3 = 0.967\mu$) at an angle $\theta_m = 84.0°$. With appropriate interpolations between curves A and B in FIG. 6, these values may be read from vertical lines (not shown) drawn at the respective $\nu_3$ or $\lambda_3$ values in FIG. 6.

In order to achieve phase matching at these frequencies (or wavelengths), what we term "orthogonal phase matching" should be used. This term means that the two lowest frequency (longest wavelength) interacting radiations should be orthogonally polarized. This relationship is made desirable by the positive birefringence of ZnGeP$_2$. The general relationships of indices of refraction and wavelengths are shown in the conventional index dispersion curves 61 (extraordinary index) and 62 (ordinary index) in FIG. 4. It is seen that the highest frequency radiation (shortest wavelength $\lambda_3$) lies on ordinary index curve 61. The next lower frequency, longer wavelength, $\lambda_2$, radiation lies on extraordinary index curve 61; and the lowest frequency, longest wavelength, $\lambda_1$, radiation lies on ordinary index curve 62. These general relationships shown in FIG. 4 pertain to both of the embodiments of the invention.

The crystal 22 of zinc germanium phosphide may be grown as follows. The technique can be generally described as unidirectional solidification of phosphorous-rich melts (approximately 10 mole percent excess) contained in pyrolytic graphite crucibles inside quartz ampules. Six gram melts composed of the elements, were heated gradually to 1,100° C, and cooled slowly 14° per day to about 500° C. Power to the furnace was then turned off and the sample allowed to cool overnight to room temperature. The ampule containing the crucible rested in the horizontally mounted furnace so as to allow free access of the residual gases to maximum surface area of melt and also to minimize the restraint imposed by the graphite walls of the crucible during solidification. Ingots usually contained 2 to 6 crystallites. Cracking of the ingots is a problem. Alternatively, as one desirable possibility, the crystal might be grown in an essentially encapsulated manner in which B$_2$O$_3$ or other suitable encapsulent is used as a flexible membrane since it liquifies below 1,025° C, and is held under a substantial pressure of an inner atmosphere to prevent escape of phosphorous during its liquification.

For general background on growth techniques for chalcopyrite crystals, see S. A. Mughal et al, *Journal of Materials Science*, 4, 895 (1969).

Zinc germanium phosphide is a ternary semi-conductor of the chalcopyrite structure ($\bar{4}$2m). An important feature of zinc germanium phosphide is that it can be grown from a melt in centimeter size boules. The advantages of such a ternary semiconductor as ZnGeP$_2$ over, say, GaP is that the ternary compounds are not cubic. That is, ZnGeP$_2$ is uniaxial and of sufficient birefringence to be phase matchable over an interesting range of frequencies.

Zinc germanium phosphide appears deep red in transmission and single crystals are low-loss between about 0.68 micrometers and 12.4 micrometers. It is uniaxial in structure and acentric. Its bandgap, $E_g$, is about 2.25 electron volts, corresponding to a wavelength of 0.55 micrometers. Its birefringence, the difference between its ordinary and extraordinary indices of refraction, lies between approximately +0.06 and +0.04 in the wavelength range between 0.75 micrometers and 8.5 micrometers. This birefringence is significantly smaller than given recently by I. M. Ivanova et al, *Soviet Physics - Simiconductors*, Vol. 3, page 1,587 (1970). Also, our results show that the birefringence of zinc germanium phosphide is positive, a fact not previously disclosed.

The following refraction index values have been determined to be accurate to the third decimal place on a relative basis. Also, the temperature dependence of the birefringence was measured over a 50° C. rise and found to vary with wavelength between +3.5 × 10$^{-5}$ and 1 × 10$^{-5}$ per degree centigrade. It will be noted that the index of refraction values of Table I can be used to assign specific values to points on the general curves 61 and 62 of FIG. 4.

TABLE I

| $\lambda/\mu$ | $\nu=\lambda^{-1}$ $\mu^{-1}$ | n$^o$ | n$^e$ | n$^e$−n$^o$ | 10$^5$× dn$^o$/dT | 10$^5$× dn$^e$/dT | 10$^5$× dB/dT |
|---|---|---|---|---|---|---|---|
| .64 | 1.5625 | 3.5052 | 3.5802 | .0750 | 35.94 | 37.58 | 3.54 |
| .66 | 1.5152 | 3.4756 | 3.5467 | .0710 | 31.23 | 37.34 | 3.32 |
| .68 | 1.4706 | 3.4477 | 3.5160 | .0684 | 29.52 | 32.53 | 3.13 |
| .70 | 1.4286 | 3.4233 | 3.4885 | .0652 | 48.63 | 31.82 | 2.97 |
| .75 | 1.3333 | 3.3730 | 3.4324 | .0595 | 26.22 | 28.26 | 2.66 |
| .80 | 1.2500 | 3.3357 | 3.3915 | .0558 | 24.69 | 26.43 | 2.44 |
| .85 | 1.1765 | 3.3063 | 3.3593 | .0530 | 24.12 | 25.39 | 2.27 |
| .90 | 1.1111 | 3.2830 | 3.3336 | .0506 | 22.34 | 24.61 | 2.14 |
| .95 | 1.0526 | 3.2638 | 3.3124 | .0486 | 21.32 | 24.26 | 2.04 |
| 1.00 | 1.0000 | 3.2478 | 3.2954 | .0476 | 21.18 | 23.01 | 1.95 |
| 1.10 | .9091 | 3.2232 | 3.2688 | .0456 | 20.11 | 22.05 | 1.82 |
| 1.20 | .8333 | 3.2054 | 3.2493 | .0438 | 18.63 | 20.51 | 1.73 |
| 1.30 | .7692 | 3.1924 | 3.2346 | .0423 | 16.84 | 20.12 | 1.66 |
| 1.40 | .7143 | 3.1820 | 3.2244 | .0423 | 15.34 | 16.55 | 1.60 |
| 1.60 | .6250 | 3.1666 | 3.2077 | .0411 | 15.10 | 16.75 | 1.53 |
| 1.80 | .5556 | 3.1562 | 3.1965 | .0403 | 13.20 | 14.40 | 1.47 |
| 2.00 | .5000 | 3.1490 | 3.1889 | .0399 | 14.19 | 15.29 | 1.44 |
| 2.20 | .4545 | 3.1433 | 3.1829 | .0396 | 14.60 | 15.28 | 1.41 |
| 2.40 | .4167 | 3.1388 | 3.1780 | .0391 | 14.14 | 15.49 | 1.39 |
| 2.60 | .3846 | 3.1357 | 3.1745 | .0388 | 15.13 | 16.80 | 1.37 |
| 2.80 | .3571 | 3.1327 | 3.1717 | .0390 | 15.48 | 16.05 | 1.36 |
| 3.00 | .3333 | 3.1304 | 3.1693 | .0388 | 13.26 | 13.96 | 1.35 |
| 3.20 | .3125 | 3.1284 | 3.1671 | .0386 | 14.94 | 16.28 | 1.34 |
| 3.40 | .2941 | 3.1263 | 3.1647 | .0384 | 14.40 | 15.46 | 1.34 |
| 3.60 | .2778 | 3.1257 | 3.1632 | .0376 | 15.58 | 16.29 | 1.33 |
| 3.80 | .2632 | 3.1237 | 3.1616 | .0380 | 14.58 | 16.53 | 1.33 |
| 4.00 | .2500 | 3.1223 | 3.1608 | .0386 | 14.26 | 15.02 | 1.33 |
| 4.20 | .2381 | 3.1209 | 3.1595 | .0386 | 13.57 | 15.14 | 1.33 |
| 4.50 | .2222 | 3.1186 | 3.1561 | .0374 | 15.31 | 16.60 | 1.32 |
| 4.70 | .2128 | 3.1174 | 3.1549 | .0375 | 15.51 | 16.71 | 1.32 |
| 5.00 | .2000 | 3.1149 | 3.1533 | .0383 | 15.05 | 16.43 | 1.32 |
| 5.50 | .1818 | 3.1131 | 3.1518 | .0387 | 14.49 | 15.42 | 1.32 |
| 6.00 | .1667 | 3.1101 | 3.1480 | .0379 | 14.58 | 16.30 | 1.32 |
| 6.50 | .1538 | 3.1057 | 3.1445 | .0387 | 15.60 | 16.13 | 1.32 |
| 7.00 | .1429 | 3.1040 | 3.1420 | .0380 | 12.85 | 15.01 | 1.33 |
| 7.50 | .1333 | 3.0994 | 3.1378 | .0384 | 18.15 | 18.59 | 1.33 |
| 8.00 | .1250 | 3.0961 | 3.1350 | .0389 | 16.10 | 17.43 | 1.33 |
| 8.50 | .1177 | 3.0919 | 3.1311 | .0392 | 15.16 | 17.37 | 1.33 |
| 9.00 | .1111 | 3.0880 | 3.1272 | .0392 | 15.56 | 17.60 | 1.34 |
| 9.50 | .1053 | 3.0836 | 3.1231 | .0395 | 16.27 | 17.11 | 1.34 |
| 10.00 | .1000 | 3.0788 | 3.1183 | .0395 | 16.53 | 18.41 | 1.34 |
| 10.50 | .0952 | 3.0738 | 3.1137 | .0399 | 15.40 | 16.84 | 1.34 |
| 11.00 | .0909 | 3.0680 | 3.1087 | .0398 | 15.26 | 16.31 | 1.34 |
| 11.50 | .0870 | 3.0623 | 3.1008 | .0386 | 14.71 | 18.32 | 1.34 |
| 12.00 | .0833 | 3.0552 | 3.0949 | .0397 | 14.24 | 16.59 | 1.34 |

The nonlinear polarization pertinent to the sumfrequency generation in FIG. 1 is described generally by the following equations for $\bar{4}2m$ point group crystals.

$$P_X = 2d_{14} E_Y E_Z, \quad (1A)$$
$$P_Y = 2d_{14} E_Z E_X, \quad (1B)$$
$$P_Z = 2d_{36} E_X E_Y, \quad (1C)$$

where $P$ is the Fourier amplitude of the polarization wave and $E$ is the amplitude of the electric field. A polarization wave is a wave of electric dipoles which radiate. The subscripts of the $E$'s indicate the component of electric vector polarization of those fields; and the subscripts of the $P$'s represent the polarization of the electric vector, radiated by the polarization wave.

Equations (1) describe the allowed coefficients for mixing of fields along the X,Y,Z axis where frequencies are not indicated. Since we desire propagation nearly in a plane UV and nearly along one of the axes U and V, were U makes 45° with the X and Y axes, it is convenient to rotate the coordinate system as shown in FIG. 1A and given in Equations (2).

$$P_U = 2d_{14} E_Z E_U, \quad (2A)$$
$$P_V = -2d_{14} E_Z E_V, \quad (2B)$$
$$P_Z = d_{36} (E_U^2 - E_V^2). \quad (2C)$$

Knowing that frequencies $\nu_1, \nu_2, \nu_3$ must be polarized as seen in FIG. 4, we then can choose the proper equations from (2) to mix our fields at the appropriate frequencies. In Equations (3A,B,C) we show the proper equations describing three frequency phase matched mixing.

$$P_{11}^e = -2d_{14} E_{2z}^e E_{31}^o, \quad (3A)$$
$$P_{2z}^e = -2d_{36} E_{11}^o E_{31}^o, \quad (3B)$$
$$P_{31}^o = -2d_{14} E_{2z}^e E_{11}^o. \quad (3C)$$

Equations (3A) and (3B) indicate production of signal and idler polarization waves at $\nu_1$ and $\nu_2$ for parametric oscillation, to be discussed hereinafter. The number subscript of each $E$ represents the frequency involved. The superscripts $o$ and $e$ indicate whether the polarization is ordinary or extraordinary. Equation (3C) indicates phase-matched sum-mixing for up-conversion in an arrangement such as that in the embodiment of FIG. 1. If the propagation of the input waves is at an angle $\theta_m$ with respect to the optic (Z) axis, then $E_{2z} = E_2 \sin \theta_m$, where $E_2$ is the field strength at $\nu_2$. It will be noted that the 1.06 micrometer radiation from source 18 is polarized as an extraordinary wave in crystal 22, i.e., nearly parallel to the optic axis Z, and the 10.6 micrometer radiation from transmitter 11 and the sum-frequency generated radiation are preferably polarized as ordinary waves, that is, orthogonal to the Z axis and parallel to the U axis, or substantially so.

In the embodiment of FIG. 1 the two lowest frequencies in the interaction are required to be orthogonally polarized. Because of the small birefringence, phase-matched mixing is obtained when the highest frequency in the interaction is reasonably close to the higher of the two lower frequencies so that the interaction is far from the degenerate condition ($\nu_1 = \nu_2$).

Figure 2A:
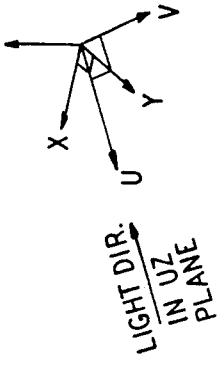
FIG. 2A shows a coordinate system useful in designating crystal orientation in FIG. 2 with respect to light beam direction.

A parametric oscillator according to our invention is shown in FIG. 2. In this case, it is desired to obtain tunable signal and idler frequencies ($\nu_1$ and $\nu_2$, in either order) when only the pump radiation at $\nu_3$ (the highest frequency in the interaction) is supplied to the zinc germanium phosphide active crystal 32, which is oriented essentially the same as crystal 22 of FIG. 1 with respect to the beam propagation direction, as shown in FIG. 2A. The oscillator includes, as its pump radiation source, the neodymium ion laser 31 which employs neodymium ions in an yttrium aluminum garnet host rod 35 and is excited by the flash or continuous pump lamp 33 which in turn is excited by an electrical source 34. The resonator for the pump laser 31 is provided by pump reflector 41, reflective at $\nu_3$, on one surface of crystal 32 and the mode-selecting prism resonator 42, also reflective at $\nu_3$, and including the prism 43, the end reflector 44, and the lateral reflector 45. The prism resonator 42 is enclosed in a temperature-controlled apparatus 26 in order to enable compensation for other changes in the pump pathlength due to changes in the tuning condition of the parametric oscillator crystal 32. A lens 36 is disposed between the active crystal 32 and the laser 31 to provide adequate focusing of the pump oscillations within crystal 32.

The parametric oscillator resonator is formed in part by the idler (or signal) reflector 46, reflective at the wavelength, either $\lambda_1$ or $\lambda_2$, on the opposite surface of crystal 32 from the pump reflector 41. The idler (or signal) resonator is completed by the idler (or signal) reflector 47 which is axially movable by piezoelectric means 48 in response to the fine-tuning voltage source 49. The idler (or signal) reflectors 46 and 47 as well as the pump reflector 41 are illustratively made highly transmissive for the signal (or idler) wavelength, the other one of $\lambda_1$ and $\lambda_2$, to make this parametric oscillator of the singly-resonant variety disclosed in the copending patent application of A. Ashkin and J. E. Bjorkholm, Ser. No. 808,767, filed Mar. 20, 1969. Nevertheless, the reflectors 46 and 47 could also be reflective at both signal and idler wavelengths to make this oscillator one of the doubly resonant type, which are known to operate with lithium niobate crystals, for example. Also, pump reflector 41 could be between reflector 46 and laser crystal 35, so that the parametric crystal would be external to the pump laser cavity.

While the cavity 32 is oriented nominally as shown in the vector diagram of FIG. 2A, it is mounted for coarse tuning of signal and idler frequencies by rotation about an axis orthogonal to the plane formed by the axis of the idler resonator and the optic Z axis. This axis of rotation is parallel to the V axis of Equation (3C) above, which extends at 45° between both the X and Y crystalline axes of crystal 32.

For additional fine tuning of the parametric oscillator, the crystal 32 with its end reflectors 41 and 46, is disposed in a variable temperature-controlled apparatus 50 in such a way that it is still free to rotate about the indicated axis of rotation. The temperature range of control of apparatus 50 is from 77° K to about 800° K. It should be understood that, in a singly-resonant oscillator, only one tuning technique is required. The two fine-tuning techniques make it possible to provide both signal and idler resonance with reflectors 46 and 47, without jumps or discontinuities in the tuning characteristic. Electric field tuning is also possible.

The operation of the embodiment of FIG. 2 differs from the operation of the embodiment of FIG. 1 in that the highest frequency in the nonlinear interaction in the zinc germanium phosphide crystal 32 is the pump frequency instead of the generated frequency. The diagram of FIG. 4 is equally applicable to the parametric oscillator if it is now considered that the 1.06 micrometer pump radiation has wavelength $\lambda_3$. The pump radiation is illustratively polarized as an ordinary wave, unlike the 1.06 micrometer radiation in the embodiment of FIG. 1. Its propagation will be determined by an index value on ordinary index of refraction curve 62. The signal (or idler) wavelength will be wavelength $\lambda_2$, which is polarized as an extraordinary wave, that is, polarized parallel to the Z axis. The pertinent value of index of refraction lies on curve 61. It will be noted that wavelength $\lambda_2$ is illustratively not resonated; and, since it is relatively close to the pump wavelength, its not being resonated simplifies the fabrication of the reflectors and the requirements on their passbands and variations in reflectivity with wavelength. The idler (or signal) wavelength is the wavelength $\lambda_1$ indicated in FIG. 4, is polarized as an ordinary wave, and is resonated by the reflectors 46 and 47. For it, the pertinent value of index of refraction lies on ordinary curve 62 in FIG. 4.

Oscillation occurs in these relative polarizations to satisfy phase-matching conditions, the equations for which are now well known. The signal and idler wavelengths $\lambda_2$ and $\lambda_1$ may be picked from the curves of FIG. 6 at the intersection points with the left-hand dot-dash vertical line for a 1.064 micrometer pump, and a selected phase-matching angle. The corresponding frequencies are given by the right-hand dot-dash vertical line. For example, at $\theta_m = 90°$, which yield phase matching normal to the optic axis, the values are found on curves A and are wavelengths to about 1.2 micrometers and about 9.7 micrometers. It appears promising to obtain parametric oscillation with one of the wavelengths as short as about 0.85 micrometers. With an appropriate pumping radiation, any oscillation wavelength between 0.85 micrometer and 12 micrometers can be selected. Of course, this oscillator could also be pumped with an available tunable parametric oscillator or a tunable laser, with a consequent overall increase in total tuning range.

It should be appreciated that either $\lambda_1$ or $\lambda_2$ can be called the signal or the idler radiation and that either is a suitable output radiation, whether or not it is resonated in crystal 32. Moreover, the wavelength nearest the pump wavelength can be resonated, the other not resonated, if so desired. Reflectors with suitable stop-bands and passbands are available.

The threshold for parametric oscillation under optimum focusing conditions, as set forth in the above-cited patent to G. D. Boyd and D. A. Kleinman, may be calculated. If the pump is $\nu_3 = 0.94\mu^{-1}(\lambda_3 = 1.064\mu)$ then $\nu_2 = 0.84\mu^{-1}(\lambda_2 = 1.19\mu)$ and $\nu_1 = 0.10\mu^{-1}(\lambda_1 = 10\mu)$ and the minimum parametric oscillator threshold power $P_3$ for a crystal of $l = 1$ cm will be 0.8 watt for a double resonant oscillator (not shown) and 16 watts for a single resonant oscillator, assuming a one-way resonator loss of 10 percent at the signal and idler for the double resonant oscillator and 10 percent at the signal alone for the single resonant oscillator, as shown.

As another example, the $Dy^{3+}:CaF_2$ laser at $\nu_3 = 0.424\mu^{-1}(\lambda_3 = 2.36\mu)$ would produce parametric oscillation at $\nu_2 = 0.253\mu^{-1}(\lambda_2 = 3.95\mu)$ and $\nu_1 = 0.171\mu^{-1}(\lambda_1=5.85\mu)$, at $\theta_m = 90°$, and have thresholds for 1.4 watts and 28 watts for double resonant oscillators and single resonant oscillators, respectively, assuming the same crystal length and loss. On a repetitive pulsed basis, these single resonant oscillators seem extremely attractive.

The parametric oscillator of FIG. 2 compares very favorably with prior art parametric oscillators, since $ZnGeP_2$ has a very large nonlinear coefficient $d_{14}$, more than 0.8 of that of gallium arsenide (GaAs). A figure of merit for parametric oscillators is $d^2/n^3$, where $n$ is the average, typical, index of refraction.

In both of the embodiments of FIGS. 1 and 2, although collinear phase matching has been illustrated and described, noncollinear phase matching of the interacting waves could be used. That is, the interacting waves could propagate in different directions.

We claim:

1. An optical device comprising
a single crystal of zinc germanium phosphide,
means for supplying to said crystal at least one beam of radiation in the near infrared portion of the spectrum, and
means including an orientation of said crystal for providing a phase-matched interaction of said supplied beam with two other beams of radiation having differing frequencies also differing from that of said supplied beam, at least one of said beams being produced by said interaction, the ones of said beams having the two lowest frequencies having orthogonal polarizations.

2. An optical device according to claim 1 in which the interaction providing means includes an orientation of said crystal with its optic axis nearly normal to the direction of propagation of said supplied beam, all of said beams propagating substantially collinearly in said crystal.

3. An optical device according to claim 1 adapted for optical mixing in that
said interaction providing means includes an orientation of said crystal with its optic axis nearly normal to direction of propagation of at least one supplied beam, and
said supplying means supplies to said crystal substantially collinearly the two lowest frequency beams having orthogonal polarizations.

4. An optical device according to claim 2 adapted for parametric oscillation in that
said supplying means supplies to said crystal with ordinary polarization the one of the interacting beams having the highest frequency, and
the interaction providing means includes means for resonating at least one of the two lowest frequency beams having orthogonal polarizations.

5. An optical mixing device comprising
a single crystal of zinc germanium phosphide,
means for supplying to said crystal two substantially collinearly-propagating differing-frequency beams having orthogonal linear polarizations,
one of said beams having a wavelength near ten micrometers in the infrared,
the other of said beams having a wavelength near one micrometer in the infrared, and
means including both stoichiometry and orientation of said crystal for providing the phase-matched generation of a third substantially collinearly propagating beam at a frequency equal to the sum of the frequencies of said supplied beams.

6. A device according to claim 5 including an avalanche photodiode disposed to respond to said third beam.

7. A device according to claim 5 including a photomultiplier having a photocathode disposed to respond to said third beam.

8. An optical parametric oscillator comprising
a single crystal of zinc germanium phosphide,
means for supplying to said crystal a beam of linearly polarized radiation having a wavelength between about 0.8 micrometers and about 3.7 micrometers, and
means for providing a phase-matched interaction of said supplied beam with two other beams of radiation having differing frequencies both lower than the frequency of said supplied beam, said providing means including
means for resonating at least one of said other beams, and
an orientation of said crystal with its optic axis nearly normal to the direction of propagation of said supplied beam to yield collinear propagation of all of said beams and nearly normal to the polarization of said supplied beam to yield linear polarizations of said two other beams in directions orthogonal to each other.

9. An optical parametric oscillator according to claim 8 in which the orientation of the crystal includes the orientation of the X and Y crystalline axes to be nearly at 45° with respect to the direction of propagation of the supplied beam.

10. An optical mixing device according to claim 5 in which the orientation of the crystal includes the orientation of its optic axis substantially orthogonal to the polarization of the ten micrometer-supplied radiation and the orientation of the X and Y crystalline axes to be substantially at 45 degrees with respect to the direction of propagation of the supplied beams.

11. An optical parametric oscillator according to claim 8 including temperature-controlled means for changing the temperature of said crystal to tune the frequencies of said two lowest-frequency beams, said crystal being rotatable about an axis substantially orthogonal to the optic axis of said crystal and substantially orthogonal to the direction of propagation of said resonated beam.

* * * * *